March 15, 1938.  E. L. CONNELL  2,111,280
CLUTCH MECHANISM
Filed Nov. 9, 1933  2 Sheets-Sheet 1

INVENTOR.
Edwin L. Connell.
ATTORNEY.

March 15, 1938.  E. L. CONNELL  2,111,280
CLUTCH MECHANISM
Filed Nov. 9, 1933  2 Sheets-Sheet 2

INVENTOR.
Edwin L. Connell.
BY Slongland Canfield
ATTORNEY.

Patented Mar. 15, 1938

2,111,280

UNITED STATES PATENT OFFICE 2,111,280

CLUTCH MECHANISM

Edwin L. Connell, Cleveland Heights, Ohio

Application November 9, 1933, Serial No. 697,277

35 Claims. (Cl. 192—48)

This invention relates to clutch mechanisms and particularly to clutch mechanisms adaptable for use in power operated tools.

It is an object of the invention to provide an improved clutch mechanism for transmitting power from a driving to a driven machine element.

Another object is to provide a clutch mechanism having improved releasing means whereby when the load transmitted by the clutch from a driving to a driven element exceeds a predetermined value the clutch may automatically be released to break the driving connection from the driven element.

Another object is to provide such a clutch mechanism having improved adjusting means for adjusting the predetermined value at which the clutch automatically releases.

Another object is to provide, in a power transmitting clutch mechanism of the type employing a helical spring, an improved mounting and associated elements for the spring.

Another object is to provide a rotary power transmitting clutch mechanism through which power in alternate directions may be transmitted.

Another object is to provide an improved rotary power transmitting clutch mechanism which may be reversed to transmit rotary power in alternate directions and in at least one of which directions the clutch is automatically releasable upon the attainment of transmitted torque above a predetermined value.

Another object is to provide a clutch mechanism particularly adaptable to portable power driven tools such as tools for screwing on nuts or the like and for unscrewing the same, and when operating in the screwing-on direction, having automatic releasing means to release the application of power when the applied torque reaches a predetermined value, and whereby torque may be applied directly from the power means in the screwing-off direction independently of the release means.

Other objects will be apparent to those skilled in the art to which my invention appertains.

My invention is fully disclosed in the following description taken in connection with the accompanying drawings, in which.

Figures 1, 2, 3:
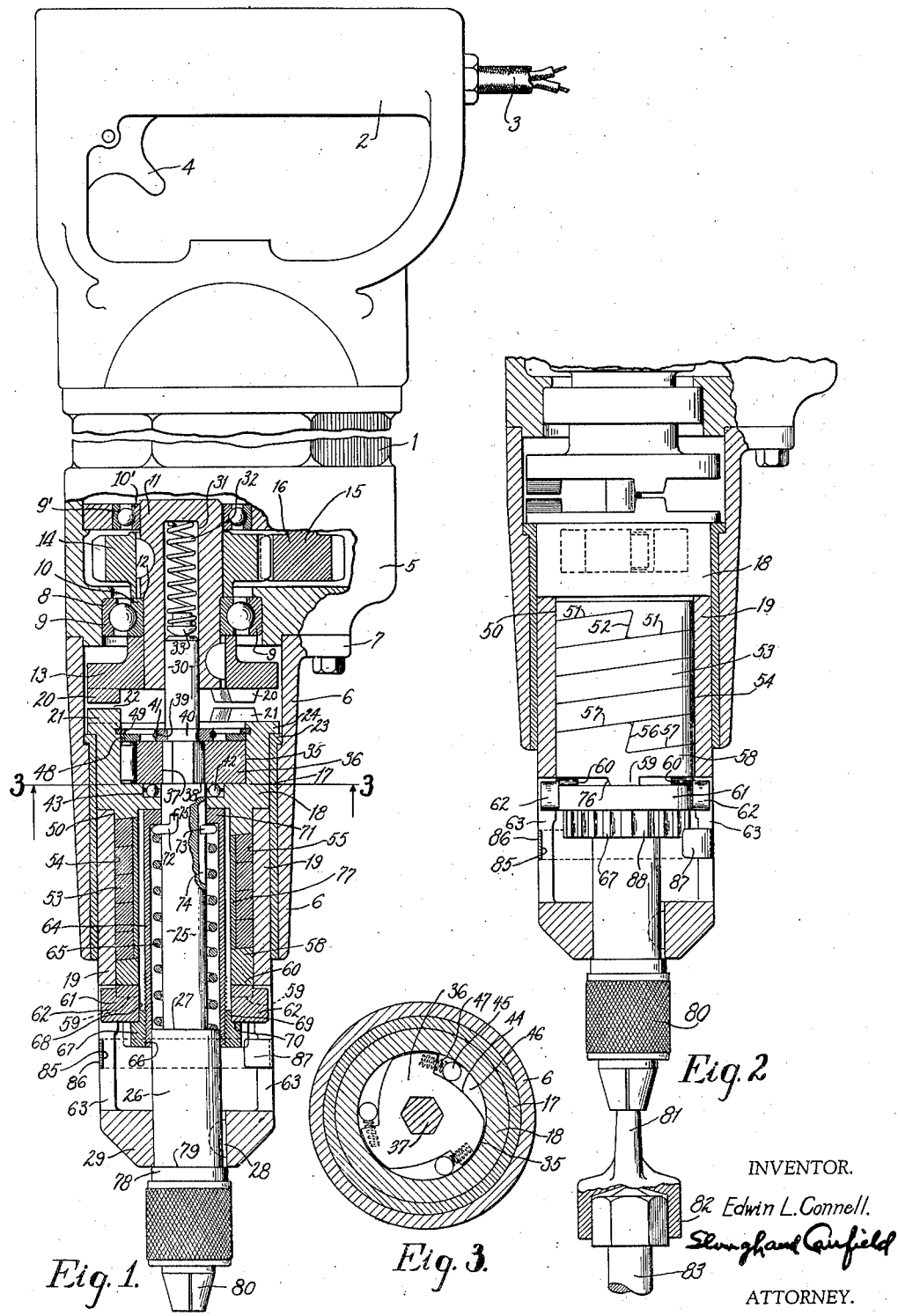
Fig. 1 is a side longitudinal sectional view of a portable tool of the motor driven type illustrating an embodiment of my invention applied thereto.
Fig. 2 is a partly sectional partly elevational view of the embodiment of Fig. 1 taken from a plane at right angles to the sectional plane of that figure.
Fig. 3 is a transverse sectional view taken from the plane 3—3 of Fig. 1.

Referring to the drawings, I have shown at 1 the external housing of a motor which has been broken apart transversely to shorten it longitudinally to clarify the drawings, the housing terminating upwardly in a pistol grip handle 2 to which an electric current supplying cord 3 is secured and adjacent to which a trigger type switch 4 is disposed, whereby upon gripping the handle 2 an operator may, with his finger, actuate the trigger 4 to close a circuit from the wire 3 to start the motor in the housing 1.

By means of the handle 2 also the operator may depress downwardly upon the tool as a whole to suitably apply pressure upon the work in a manner to be described, by which, in a manner to be described, the clutch mechanism of my invention may be actuated.

The motor housing 1 has in the lower portion thereof a housing 5 upon the lower end of which is secured a downwardly projecting tubular housing 6 secured to the housing 5 by a flange 7 and suitable bolts projected therethrough.

A ball bearing shown generally at 8 has an outer raceway 9 fitted into a suitable bore in the lower part of the housing 5 and the inner raceway 10 thereof is pressed upon a spindle 11 engaging a shoulder 12 thereon; a driving clutch member 13 is keyed to the spindle 11 to be driven thereby and is press-fitted on the lower end of the spindle 11 to clamp the inner raceway 10 against the shoulder 12.

Upon the spindle 11 above the raceway 10 is keyed a gear 14 meshed with a pinion 15, the latter having a shaft 16 connected to the motor (not shown) in the housing 1; and by this means the driving clutch member 13 may be rotatably driven by the motor.

A second inner raceway 10' is pressed upon the spindle 11 above the gear 14 and a cooperating outer raceway 9' is pressed into a suitable bore in the housing 5. Thus the spindle 11 and clutch member 13 are rotatably supported as a unit on the housing through the ball bearings.

The tubular housing 6 has a bore coaxial with the spindle 11, lined with a bearing sleeve 17 in which is rotatably fitted the driven clutch member 18 and driven head 19, these parts being formed outwardly with cylindrical surfaces fitting the bore of the sleeve 17.

The lower surface of the driving clutch member 13 is provided with a plurality, such as three, depending lugs or jaws 20—20, and the upper portion of the driven clutch member 18 is similarly provided with lugs or jaws 21—21, the outer axial ends of the respective lugs or jaws being spaced from each other as shown at 22; but in the operation to be described, the jaws 21 may be moved axially and be overlapped with the lugs 20 to effect driving engagement therethrough.

The bearing sleeve 17 has on its inner end an outwardly extending flange 23 overlapping a shoulder on the tubular housing 6. The driven clutch member 18 has a corresponding flange 24 overlapping the flange 23. By this means the rotatable driven clutch member 18 is prevented from moving axially outwardly from the tubular housing 6.

A rotary shaft 25 extends axially through the mechanism thus far described and on a lower portion projecting out of the housing 6 is enlarged as at 26 to provide a head and to provide a shoulder 27. The head 19 is generally tubular, the lower end of which is closed by a relatively thickened portion 29 which also is keyed as at 28 to the head 26 of the shaft to rotate therewith and to move axially therewith bodily.

The upper portion 30 of the shaft 25 is of reduced diameter and is rotatable in a bore 31 of the spindle 11. Above the end 30 of the shaft, and in the bore 31, is disposed a helical compression spring 32 having secured in one end thereof a rounded button 33 engaging the shaft extreme upper end portion 30 and the other end of the spring abutting upon the bottom of the bore 31. The spring 32 thus exerts constantly downward thrust on the shaft 25, whereby as will presently be understood, the clutch jaws 20 and 21 are normally disengaged by downward axial movement of the shaft effected by the spring 32. The button form of the device 33 reduces to a negligible amount friction occasioned by relative rotation of the shaft and spindle 11.

The upper side of the driven clutch member 18 is recessed as shown at 35 and in the recess is disposed a ratchet head 36 having a central axially extending bore 37, hexagonal in cross-section, whereby it may be drivingly associated with the shaft 25 by fitting upon a corresponding hexagonal portion 37 of the shaft. The lower side of the ratchet head 36 engages a shoulder 38 on an adjacent portion of the shaft 25 and is restrained from movement away from the shoulder by a split ring 39 seated in a shallow groove 40 in the shaft and overlapping adjacent portions of the ratchet head 36. The split ring 39 may be retained in closed shaft gripping condition by a wire 41 circumscribing the same. The ratchet head 36 is thus rigidly secured against axial movement on the shaft. The lower side of the ratchet head 36 rests upon the balls 42 of a thrust ball bearing which in turn is seated in a recess 43 in the driven clutch element 18.

In the structure to be described, a spring 65 exerts thrust axially tending to move the clutch element 18 vertically (as viewed in Fig. 1) with respect to the shaft 25, and the thrust ball bearing comprising the balls 42 engaging the lower side of the ratchet head 36 on the shaft and the upper side of the recess 43 of the clutch element, absorbs this thrust substantially without friction.

The ratchet head 36 may be of a well known construction having wedge-shaped lateral faces 44 between which and the wall of the recess 35, rollers 45 are disposed resiliently pressed toward the narrow end of the wedge-shaped space 46 thus provided by compression springs 47. As is well known, upon rotation of the driven clutch element 18 counter-clockwise as viewed in Fig. 3, it will rotate freely relative to the ratchet head 36 in the recess 35; but upon rotation of the driven element 18 clockwise, the rollers 45 will effect a wedging engagement between the faces 44 and the recess wall and lock the head with the driven clutch element to drive the ratchet head. The rollers 45 are retained in position axially by engaging at one end the bottom of the recess 35, and to engage their opposite ends an annular plate 48 is disposed in the recess locked in position against outward movement by an annular split ring 49 seated in a corresponding groove in the side of the recess.

The lower portion of the driven clutch element 18 is of reduced diameter as at 50 and fits into the inner cylindrical bore of the tubular driven head 19 at the upper end thereof, and within the head 19 has its lower axial end of helicoidal form as shown at 51, Fig. 2, providing a shoulder 52 whereby it completely fits the upper end of a helical spring 53, closely wound and preferably formed from metal rectangular in cross-section whereby to provide an outer cylindrical surface 54 of diameter substantially the same but preferably slightly less than the diameter of the bore 55 of the tubular driven head 19.

The lower end of the spring 53 is fitted upon a shoulder 56 and upon inclined helicoidal surfaces 57—57 of an intermediate driving clutch element 58 externally cylindrical and axially movable in the bore 55, and having on its lower surface a plurality, preferably two, outwardly extending lugs or jaws 59 adapted upon relative rotary movement to engage a corresponding pair of lugs or jaws 60 projecting upwardly from a ring form intermediate driven clutch element 61 which has outwardly radially extending splines 62—62 projected into vertically disposed spline slots 63—63 in the wall of the tubular driven head 19.

A spring housing 64 in the general form of an elongated cup has its cup skirt surrounding and coaxial with the shaft 25 but spaced therefrom to provide space for helically wound compression spring 65 to be disposed within the cup skirt and around the shaft 25; and the lower or open end of the cup skirt is exteriorly threaded as at 66 and upon the threads thereof is threaded a nut 67 centered with a cylindrical bore 68 of the ring form intermediate driven clutch element 61 by a reduced diameter neck portion 69 projected into said bore. The shoulder 70 thus provided engages the lower side of the ring form intermediate driven clutch element 61 to support it.

The nut 67 and cup 64 are in turn resiliently supported by the spring 65 abutting at one end upon the shoulder 27 and at the other end upon the cup bottom 71 interiorly thereof, the cup bottom being correspondingly perforated to allow the shaft 25 to extend slidingly therethrough.

Preferably a key 72 is interposed between the upper end of the spring and the cup bottom 71 and may, as shown, be formed from a piece of round wire partly circumscribing the shaft 25 and having an inwardly radially extending end 73 projected into a longitudinally extending keyway 74 in the shaft 25 and having its opposite end 75 bent into the axial direction and projected into a suitable perforation, not shown, in the cup bottom 71.

By this arrangement, the cup is keyed to the shaft against rotation but is permitted to move axially thereof.

The lateral faces of the lugs 59 and 60, for example the face 76 of the lug 59, are inclined at a predetermined angle for a reason to be explained.

The helical spring 53, which as will be understood, is interiorly cylindrical, is lined by a cylindrical bushing 77 of metal which may extend from the driven clutch member 18 to the intermediate driving clutch element 58 and closely fits the inner wall of the spring.

In the operation of this spring to be described, the bushing assists in aligning the spring axially and disposing it so that when it is expanded to engage the cylindrical bore 55, it will engage the same more uniformly on successive operations and with greater efficiency as a gripping clutch element and will continue to operate over a greater length of time without deterioration than in prior devices of this general class where such helical springs are employed generally as a clutch element.

The head 26 or lower end of the shaft is, as above stated, projected through and keyed against rotation in the thickened transverse portion 29 of the driven head 19 and may have an enlarged diameter portion 78 providing a shoulder 79 engaging the lower end of the said head 19. Below the head 19 the shaft is provided with a chuck 80 of any known or suitable construction adapted to grip the shanks, such as 81, of various tools such as the nut or screw head receiving wrench 82 of Fig. 2.

My invention has been illustrated and described in the foregoing as embodied in a motor operated portable hand tool for screwing in cap screws and the like or screwing on nuts on bolts etc., and I have chosen this embodiment for illustration and description herein inasmuch as this is one of the particular uses of my invention.

The mode of operation of the foregoing embodiment is as follows: The operator grasps the tool handle 2 in one hand and grips the housing 6 in his other hand and presents the tool such as the wrench tool 82 to the work, for example to the head of a cap screw 83 as illustrated. Upon depressing the tool as thus held, the entire assembly including the shaft and driven head 19, driven clutch member 18, intermediate driving clutch element 58, and intermediate driven clutch element 61 will thereby be moved relatively upwardly within the tubular housing 6 (or the latter will be moved downwardly thereover). This will bring into engagement the clutch jaws 20—21. At this time power may be applied to the driving clutch member 13 through the gears 15 and 14 from a motor in the housing 1, the current to the motor being supplied through the wires 3 and under the control of the trigger-form switch 4.

The switch which is not shown but which may be of any known or suitable construction, and enclosed within the handle 2, is preferably of the reversing switch type; that is to say, when the trigger 4 is moved in one direction, the motor will be energized to turn in one direction, and when the trigger 4 is moved in the other direction the motor will be reversed in direction.

It will be assumed that when the motor was started as above referred to, it will rotate the shaft 25 in the clockwise direction as viewed from above.

The torque transmitted through the jaws 20 and 21 will turn the driven clutch member 18, and, by virtue of the shoulder 52 thereof will transmit torque to the upper end of the helical spring 53. The resistance of the load tends to hold stationary the shaft head 26 and head 19 and therefore tends to hold stationary the ring form intermediate driven clutch element 61 by virtue of the splines 62 thereof engaged with the slots 63; and this in turn will tend to hold stationary the intermediate driving clutch element 58. The tendency to hold the intermediate driving clutch element 58 will, due to the reaction of the lower end of the helical spring 53 upon the shoulder 56, cause the spring to exert a torque upon the said stationary parts to drive the load and turn the screw 83 into the work. If, however, the load of turning the screw is above that necessary to unwind the spring 53 however slightly, it will unwind and thereby expand and will grip the bore 55 of the driven head 19 and thereafter will drive the head 19 by this frictional engagement of the cylindrical wall of the spring 53 and that of the head 19.

It will be observed that the spring is kept in its expanded condition and driving engagement by the pressure of the lower end of the spring upon the shoulder 56. This pressure, as will now be apparent, is transmitted through the slots 63, splines 62, intermediate driven clutch element 61, and through the inclined jaw faces 76—76 to the intermediate driving clutch element 58.

If now the load of running in the screw 83 should reach a predetermined value such as that occurring when the head of the screw is forced home, the load transmitted through the inclined faces 76, which are of predetermined inclined angle, will be sufficient to cause them to slide over each other and cause the intermediate driven clutch element 61 to be moved downwardly until the jaws 60 can slide over the jaws 59. The spring expanding torque is thereby released and the spring 53 contracts slightly and slips in the bore 55 permitting it and the intermediate driving clutch element 58 to rotate. A half revolution later, the lugs 59 will engage the lugs 60 again, and if the predetermined load is still present, they will again force the clutch element 61 downwardly and ride thereover. Thus, at the attainment of said load, the clutch is released and it will be indicated to the operator by the periodic clicking and jumping of the clutch element 61 over the teeth 59 of the clutch element 58.

The predetermined load may be adjustably varied by screwing the nut 67 up or down to vary the tension of the spring 65 which is the spring which holds, resiliently, the clutch element 61 upwardly against the clutch element 58, and supplies the force to hold the inclined teeth 59 and 60 in engagement. Obviously, screwing the nut 67 to pull the cup skirt 64 downwardly, will increase the tension of the spring 65 and raise the releasing or tripping clutch load.

During this operation the relatively small axial thrust to hold the wrench 82 to its work is taken upwardly on the ball bearing 8—10. When the clutch begins to slip or is released as above described, the operator may remove the wrench preparatory to applying it to another screw.

When it is desired to unscrew a bolt or remove a nut, the tool 82 is presented to the head or to the nut as illustrated in Fig. 2 and the switch 4 is thrown to the reverse position. Thereupon the driving clutch member 13 is rotated counterclockwise as viewed from above. Now upon depressing the tool to engage the clutch jaws 20—21, the driven clutch member 18, Fig. 3, is rotated in the clockwise direction. This causes the rollers 45 to move toward the apex of the wedge-shape spaces 46 to effect a clutch grip between the ratchet head 36 and the inner wall of the recess 35 of the driven clutch member 18 to lock these two members together. This locks the axially disposed shaft 25 with the driven clutch member 18 and rotates the shaft positively in the reverse direction from that above described.

The full torque of the motor is supplied directly to the shaft to loosen the nut or the screw and continued rotation thereof will remove it. In either case, upon removing the tool from the work, the spring 32 will expand and shove the shaft downwardly and disengage the clutch jaws 20—21 whereby, although the motor may be continued in movement, the tool will stop rotating in order that it may conveniently be presented to the work.

In order to fix the releasing load adjustment, any suitable means may be provided to prevent the nut 67 from changing its position on the threads 66. The preferred means is to form a shallow groove 85 in the outer generally cylindrical wall of the head 19 and to place therein a flat circular spring 86 having at one side of the circle an inwardly projecting finger 87 and providing on the periphery of the nut 67 a series of teeth 88 engageable by the finger 87. The annular spring 86 may be secured against rotation in its groove 85 in any suitable manner, and the finger 87 may be removed outwardly radially from its engaged tooth 88 to permit rotating the nut to change the adjustment.

According to the above description of the construction and mode of operation it will be observed that power applied to the driven clutch member 18 is transmitted through the spring 53 to the ring form intermediate driven clutch element 61; and that the clutch element 61 alone will rotatively drive the head 19 and the tool thereon if the torque load is below a certain minimum; and that if the load rises above this minimum, then some of the torque applied to the spring 53 will be transmitted directly into the head 19 and a relatively small fraction of the torque will be transmitted to the clutch element 61 and thence to the head 19. As the load torque becomes greater and greater, the portion of the load transmitted to and through the clutch element 61 becomes greater; and if the total torque load reaches a certain maximum, the portion carried by the clutch element will be sufficient to cause it to slip, whereupon the transmission of driving torque from the spring directly to the head ceases, and the ring being unable alone to drive the head and its load, the head and its tool load stop rotating.

When the motor is reversed and the power is applied directly through the ratchet head 36 to the shaft, torque may be applied to the tool 83 up to the full capacity of the motor, there being no provision for slipping at maximum load in that direction of rotation.

Obviously, it is desirable that when the motor is applying power through the slippable clutch elements 58 and 61, the tool will rotate in the direction to screw nuts on and to screw screws in because it is desirable that the clutch shall slip when the head of the screw or when the nut jams upon the work, and therefore when the motor is reversed to remove a nut or the like the full power of the motor will be available to start it without the possibility of any slippage occurring in the clutch.

It will be observed that the splines 62—62 projecting into the vertical slots 63, constitute a spline connection preventing relative rotary but permitting relative axial movement. Obviously, other forms of spline connection may be employed for this purpose.

The maximum load at which the clutch element 61 slips and therefore the load at which the clutch device as a whole stops transmission, while adjustable by the spring 65, is primarily determined by the slope of the cam face 76 on the lug 59 or on the corresponding faces of the lugs 60.

Thus the range of adjustment of the spring 65 may be changed as desired by changing the slope of the said cam faces.

Figure 4:
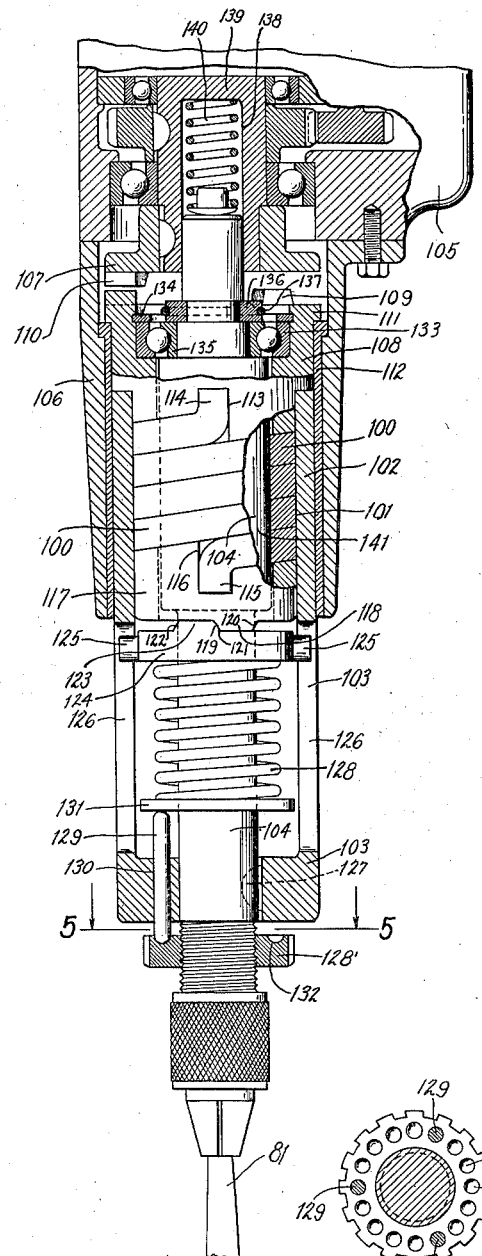
Fig. 4 is a view generally similar to Fig. 1 but illustrating a modification.
Figure 5:
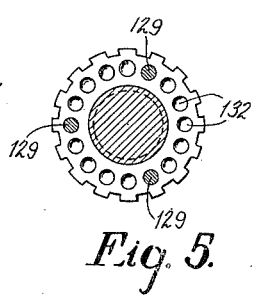
Fig. 5 is a cross-sectional view taken from the plane 5—5 of Fig. 4.

In the form of my invention illustrated in Figs. 4 and 5, a helical spring 100 is expanded to engage the inner cylindrical surface 101 on a tubular upper portion 102 of a driven head 103 to drive the driven head in one direction, say, clockwise when viewed from above, and the same helical spring 100 may be contracted to grip directly the shaft 104 to rotate it and the driven head in the other direction. The structure by which this is accomplished will now be described.

In this form a motor housing 105, a depending tubular guide 106 and a driving clutch member 107 and the bearing support and gear drive for the latter may be the same as the corresponding parts of the form of Fig. 1.

The driven clutch member 108 having upwardly projecting teeth or jaws 109 engageable with depending teeth or jaws 110 on the driving clutch member, is normally supported by a flange 111 overhanging the upper end of the liner 112 in the tubular frame member 106.

An axially extending downwardly open slot 113 is provided in the driven clutch member 108 and in this slot is seated an end portion 114 of the helical spring bent into the axial direction. By this means, rotation of the driven clutch member 108 in either direction will correspondingly tend to wind up or unwind the helical spring 100. The lower end of the helical spring 100 has a similar end portion 115 bent in the axial direction and lodged in a corresponding slot 116 in the intermediate driving clutch element 117 whereby tendency of the spring 100 to turn may be resisted in either direction of rotation. The lower portion of the intermediate driving clutch element 117 is provided with two or more lugs or clutch teeth 118 having inclined faces 119 and 120 engageable, in alternate directions of rotation, with corresponding inclined faces 121 and 122 on a corresponding plurality of clutch teeth 123 on a ring form intermediate driven clutch element 124 having splines 125—125 extending into generally axially disposed spline grooves or slots 126—126 in the driven head 103.

The shaft 104 is keyed to the driven head 103 to rotate therewith as indicated at 127. A spring 128 exerts an upward thrust on the lower side of the ring form clutch element 124 to maintain the clutch teeth 123 and 118 normally in engagement and the tension of the spring may be variably adjusted by means of a nut 128' threaded on the shaft 104 below the member 103, and a pin 129 in an axially extending bore 130 in the driven member 103, the lower end of the pin standing upon the nut 128' and the upper end of the pin engaging the underside of a washer 131 which surrounds the shaft 104 and upon which the spring 128 at its lower end abuts.

The upper surface of the nut 128' may be provided with a circular series of recesses 132 into which the end of the pin projects. By this means the nut 128' will be fixed in any rotated adjusted position. Upon turning the nut, the tension of the spring 128 may be suitably varied. Three such pins 129 may be provided if preferred as indicated in Fig. 5.

It will be observed that the upward thrust of the spring 128, transmitted through the clutch element 124, the clutch element 117 and the driven clutch member 108, tends to move the latter upwardly axially relative to the shaft 104; and to maintain the correct relation between these elements and take up this end thrust without undue friction, a ball bearing is provided comprising an outer race element 133 pressed into a suitable bore in the driven clutch member 108 and retained therein by an expanding split ring 134, and an inner race element 135 press-fitted upon the upper end of the shaft 104 and retained in position by a ring 136 having a spring wire 137 surrounding the same, the rings 134 and 136 being seated in suitable annular recesses in the parts which they engage.

The upper end of the shaft 104 may project into an axial bore 138 in a spindle 139 and a spring 140 may be provided in the spindle in a manner similar to and for the purposes of the corresponding parts more completely described in connection with Fig. 1.

In the operation of the form of my invention of Figs. 4 and 5, upon presenting a tool 81 to a screw to be run in, the clutch jaws 109—110 of the driving and driven clutch members will be engaged by the upward movement of the shaft assembly as described for the form of Fig. 1, and torque will be transmitted from the driven clutch member through the spring, intermediate driving clutch element 117 and through the jaws 123 and 118 to the ring form intermediate driven clutch element 124, and thence through the splines 125 and slots 126 to the driven head 103, and thence to the shaft 104 tending to turn it. Preferably this rotation will be in the clockwise direction as viewed from above and when the load reaches the predetermined value, the spring 100 will tend to unwind and grip the surface 101 above referred to and thereafter the driven member will be driven through the spring and through the clutch element 124; and if the load reaches a predetermined maximum such as that attained when the screw is turned all the way home, the clutch tooth faces 119 will move over the corresponding engaged faces 121 with a cam-like action compressing the spring 128 and thereafter so long as the load is present the shaft 104 will stand without rotation and the clutch teeth 118 will trip over the clutch teeth 123 at each half revolution, where two pairs of said teeth are employed, thus releasing the clutch effect.

When the motor is rotated in the reverse direction as for example to loosen and remove a nut, a similar action takes place but the spring 100 tends to wind up and the faces 120 of the clutch teeth 118 engage the faces 122 of the clutch teeth 123. As the motor torque is applied tending to turn the shaft 104 in this counter-clockwise direction as viewed from above, the spring will contract and grip the shaft 104 therewithin and the shaft is to this end preferably provided with an enlarged diameter cylindrical portion 141. Again, if the torque reaches a predetermined maximum at which it is desired that the clutch shall slip, the two faces 120 will cam over the faces 122, compressing the spring 128 and allowing the clutch to slip.

In this form of my invention it is apparent that the maximum torque load at which the clutch slips will be determined primarily by the inclination or angular slope of the clutch tooth faces 119—121 and 120—122, and that this may be further secondarily adjusted by the spring 128. It will therefore be apparent that the clutch tooth faces through which torque is applied to loosen a tight screw or nut may be of steeper inclination and therefore provide a greater maximum torque value than the other faces through which torque is applied to screw a nut on.

Figure 6:
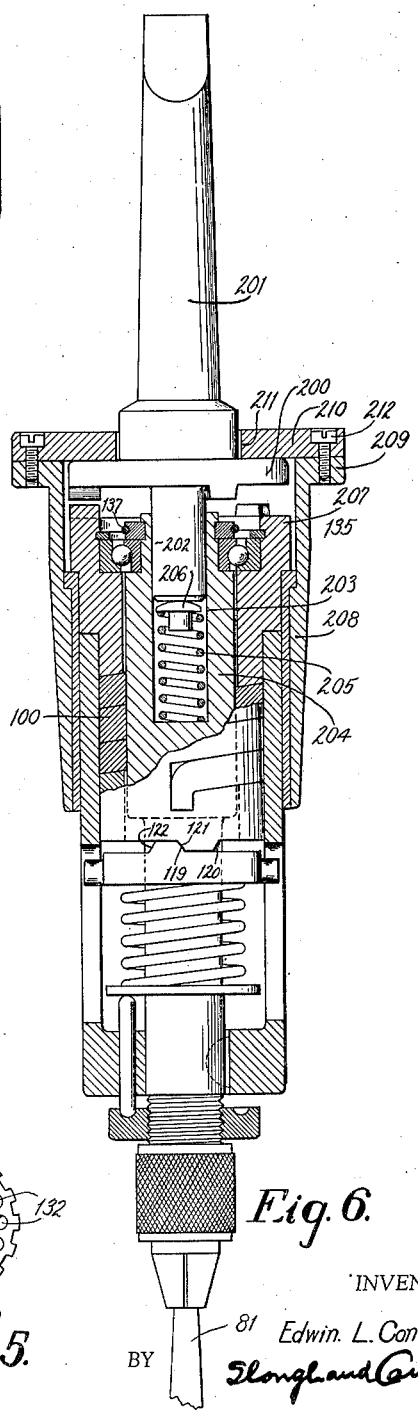
Fig. 6 is a view similar to Fig. 1 but illustrating a further modification.

In the form of my invention of Fig. 6, I have shown a construction generally similar to that of Fig. 4, but adapted to the drill holding chuck of a drill press. To this end, the driving clutch member 200 is formed upon or secured to a taper shank 201 having a standard taper for gripping in a taper chuck. The driving clutch member has a depending stub shaft 202 projecting downwardly into a bore 203 in the main shaft 204 and a compression spring 205 abuts at one end upon the bottom of the bore and at its upper end carries a round-headed button 206 abutting upon the lower end of the stub shaft 202. By this means, as will be understood, the driving clutch member 200 and driven clutch member 207 are normally held apart by the spring 205.

The depending tubular guide 208 within which the parts are mounted for rotational and axial movement has on its upper end a flange 209, and an annular plate 210 having a central perforation 211 surrounding the shank 201 is secured to the flange 209 by a circular series of screws 212.

Thus the tubular housing 208 may be supported on the plate 210 and the latter upon the driving clutch member 200 when the latter is supported by the shank 201 in a drill press chuck; and the parts within the tubular support 208 may be supported therein as described for the other forms.

The operation of the form of Fig. 6 is the same as that of Fig. 4. When the drill press chuck is lowered to apply the tool 81, the vertical or axial movement of the parts within the tubular support 208 will be guided, partly by the tubular support and partly by the stub shaft 202 telescoped in the bore 203 of the main shaft 204.

It will be observed that in the form of Figs. 4 and 6 the cylindrical surface of the shaft inside of the helical spring functions to maintain the spring in suitable condition to engage the hollow cylindrical wall of the driven clutch element when the spring is expanded, in a manner similar to that of the sleeve of the form of Fig. 1.

While I have shown my invention as embodied in three forms, my invention is not limited specifically thereto. Changes and modifications may be made without departing from the spirit of my invention or sacrificing its advantages, and within the scope of the appended claims.

I claim:

1. In a power transmitting clutch mechanism, a reversible power rotatable driven element, a torque load applying element, a first clutch for receiving power from the driven element and supplying it to the torque load applying element, a second clutch comprising engageable and disengageable clutch elements for respectively receiving power from the driven element and supplying it to the torque load applying element, the first clutch being associated with the torque load applying element to drive it and torque loads up to a predetermined maximum, the elements of the second clutch being normally disengaged and automatically engageable to drive the torque load applying element at torque loads above said maximum, and in one direction of rotation of the reversible driven element, means for effecting automatic release of both said clutches at torque loads above a predetermined maximum to stop application of load torque, and a third clutch comprising engageable and disengageable elements for receiving power from the driven element and supplying it to the torque load applying element, the elements of the third clutch being disengaged during rotation of the driven element in said one direction and automatically engageable upon rotation in the other direction to drive the torque load applying element directly.

2. A power transmitting clutch mechanism as described in claim 1 and in which the said first clutch has engageable and disengageable elements and one element has a spline connection with the torque load applying element and is provided with an inclined surface through which it is rotatably driven by the other element of the first clutch and is yieldingly prevented by resilient means from reacting on the inclined surface and being moved thereby out of engagement with the said other element of the first clutch.

3. A power transmitting clutch mechanism as described in claim 1 and in which the said first clutch comprises engageable and disengageable elements and one element has a spline connection with the torque load applying element and is provided with an inclined surface through which it is rotatably driven by power from the other element of the first clutch and is yieldingly prevented by resilient means from reacting on the inclined surface and being moved out of engagement with the said other element of the first clutch, and the resilient means comprising a spring, a threaded movable abutment for the spring, and a nut element on the abutment adjustably rotatable, the nut element engaging the said other first clutch element to resiliently exert force thereon.

4. A power transmitting clutch mechanism as described in claim 12 and in which one of the engageable and disengageable elements of the second clutch is in the form of a helical spring rotatably driven at one end by the said driven element and the other one of said engageable and disengageable elements has a cylindrical bore surrounding and engaged by the outer cylindrical surface of the spring, and the other end of the spring is adapted to transmit its rotary motion to one of the engageable and disengageable elements of the first clutch through an inclined surface provided on the other of said engageable and disengageable elements of the first clutch.

5. A power transmitting clutch mechanism as described in claim 12 and in which one of the engageable and disengageable elements of the second clutch is in the form of a helical spring rotatably driven at one end by the driven element and the other of said engageable and disengageable elements has a cylindrical bore surrounding and engaged by the outer cylindrical surface of said spring, and the other end of the spring engages and rotates bodily with one of the engageable and disengageable elements of the first clutch and the said elements of the first clutch mutually engage on inclined surfaces provided respectively thereon.

6. A power transmitting clutch mechanism as described in claim 1 and in which the engageable and disengageable elements of the third clutch comprise an outer raceway associated with the reversible driven element engaging a plurality of rolling elements and a head element drivingly associated with the torque load applying element and provided with inclined faces wedgingly engageable by the rolling elements upon rotation of the raceway in said other direction to rigidly engage the torque load applying element with the driven element.

7. In a power transmitting clutch mechanism, a power rotatable driven element, a helical spring rotatably drivable at one end by the driven element, a torque load applying element, a clutch element for rotatively driving the torque load applying element having a cylindrical bore surrounding and engageable by the outer generally cylindrical surface of the helical spring, a first intermediate clutch element rotatably drivable by the other end of the spring, jaws on the first intermediate clutch element, a second intermediate clutch element having jaws engageable by the jaws of the first intermediate clutch element, the jaws having inclined mutually engageable surfaces, and a spline connection between the second intermediate clutch element and the torque load applying element.

8. In a power transmitting clutch mechanism, a reversible power rotatable driven element, a helical spring rotatably drivable at one end by the driven element, a torque load applying element, a clutch element for rotatively driving the torque load applying element having a cylindrical bore surrounding and engageable by the outer generally cylindrical surface of the helical spring, a first intermediate clutch element rotatably drivable by the other end of the spring, jaws on the first intermediate clutch element, a second intermediate clutch element having jaws engageable by the jaws of the first intermediate clutch element, the jaws having inclined mutually engageable surfaces, a spline connection between the second intermediate clutch element and the torque load applying element, a frame rotatably supporting the driven element and torque load applying element, the reversible driven element in one direction of rotation effecting driving of the torque load applying element in one direction through the spring and through said intermediate clutch elements, a second clutch comprising a clutch element associated with the torque load applying element and a clutch element associated with the driven element, and automatic means to engage the said second clutch elements upon rotation of the reversible driven element in the other direction to effect driving of the torque load applying element in the other direction.

9. In a power transmitting clutch mechanism, a power rotatable reversible driven element, a helical spring rotatably drivable by one end portion in either direction by the driven element, a torque load applying element having a cylindrical bore and comprising a coaxial cylinder, respectively on the outside and inside of the helical spring, and respectively engageable by outer and inner cylindrical surfaces of the helical spring upon expansion and contraction thereof respectively, a first intermediate clutch element having jaws thereon and rotatably drivable in either direction by the other end of the spring, a second intermediate clutch element having jaws thereon engageable by the jaws of the first intermediate clutch element to rotatably drive the second intermediate clutch element in either direction, the jaws having mutually engageable inclined surfaces, and a spline connection between the second intermediate clutch element and torque load applying element.

10. A power transmitting clutch mechanism as described in claim 9 and in which a spring holds the inclined faces in engagement and permits them to automatically disengage upon attainment of a predetermined driving torque.

11. A power transmitting clutch mechanism as described in claim 9 and in which the inclined faces for transmitting torque in one direction are of a different inclination from that of the faces for transmitting torque in the other direction and a spring holds the inclined faces in engagement in either direction and permits them to disengage upon the attainment of predetermined torques in the corresponding directions.

12. In a power transmitting clutch mechanism, a reversible power rotatable driven element, a torque load applying element, a first clutch comprising engageable and disengageable elements for receiving power from the driven element and applying it to the torque load applying element, a second clutch comprising engageable and disengageable elements for receiving power from the driven element and supplying it to the torque load applying element, the elements of the first clutch being normally engaged and being associated with the torque load applying element to drive it at torque loads up to a predetermined maximum, the elements of the second clutch being normally disengaged and automatically engageable to drive the torque load applying element and loads above said maximum and in one direction of rotation of the reversible driven element, means for effecting automatic disengagement of the said clutch elements at torque loads above a predetermined maximum to stop application of load torque, and a third clutch comprising engageable and disengageable elements for receiving power from the driven element and supplying it to the torque load applying element, the elements of the third clutch being disengaged during rotation of the driven element in said one direction and automatically engageable upon rotation in the other direction to drive the torque load applying elements directly.

13. In a power transmission clutch mechanism, a helical spring, a torque load applying element having a hollow cylindrical surface engageable by the outer cylindrical surface of the spring upon expansion thereof, an element connected to each end of the spring, one for rotatably supplying power thereto tending to rotate the spring, the other rotatably resisting rotation of the spring and tending to cause it to expand, and a sleeve-form liner within the spring engageable by the convolutions thereof when the spring is relaxed and supported at each end upon the two said spring-connected elements.

14. A power transmitting clutch mechanism as described in claim 1 and in which the said first clutch has engageable and disengageable elements and one element has a splined connection with the torque load applying element, and is provided with an inclined surface through which it is rotatably driven by the other element of the first clutch and is yieldingly prevented by resilient means from reacting on the inclined surface and being moved thereby out of engagement with the said one element of the first clutch, and means is provided to adjustably vary the effectiveness of the resilient means to adjustably vary the releasing torque load.

15. A power transmitting clutch mechanism as described in claim 9 and in which a spring holds the inclined faces in engagement and permits them to automatically disengage upon attainment of a predetermined driving torque and means is provided to vary the effectiveness of the spring to vary the predetermined torque.

16. In a power operated portable tool, a rear driving member, means for rotating said rear driving member, a front driving member, a driving spring arranged to be actuated by said rear driving member when the latter is rotated in one direction, a slip connection comprising parts separate from and connected respectively with said spring and said front driving member, said parts having cooperating cam surfaces to cause said front driving member to normally rotate in unison with said rear driving member, one of said parts being yieldable to permit said spring and said rear driving member to rotate with relation to said front driving member when excessive resistance is offered to the movement of the latter, and other means for causing said front driving member to be rotated in a reverse direction.

17. In a power operated portable tool, a rear driving member, means for rotating said rear driving member, a front driving member, a driving spring arranged to be actuated by said rear driving member when the latter is rotated in one direction, a slip connection comprising parts separate from and connected respectively with said spring and said front driving member, said parts having cooperating cam surfaces to cause said front driving member to normally rotate in unison with said rear driving member, one of said parts being yieldable to permit said spring and said rear driving member to rotate with relation to said front driving member when excessive resistance is offered to the movement of the latter, and other means for connecting said front driving member with said rear driving member when the latter is rotated in a reverse direction.

18. In a self-contained portable tool, a rear driving member, means for rotating the same, a tubular front driving member, means for causing said front driving member to be rotated in a forward direction by said rear driving member, including a part yieldably mounted in said tubular front driving member for axial movement with relation thereto, and held against rotation with relation thereto, and a part connected with said rear driving member for rotation therewith and extending into said tubular front driving member, said parts having means for normally connecting the same for rotation in unison and for disconnecting the same when excessive resistance is offered to the rotation of said front driving member, and other means for causing said front driving member to be rotated in a reverse direction by said rear driving member.

19. In a self-contained portable tool, a rear driving member, means for rotating the same, a tubular front driving member, means for causing said front driving member to be rotated in a forward direction by said rear driving member, including a part yieldably mounted in said tubular front driving member for axial movement with relation thereto, and held against rotation with relation thereto, and a part connected with said rear driving member for rotation therewith and extending into said tubular front driving member, said parts having means for normally connecting the same for rotation in unison and for disconnecting the same when excessive resistance is offered to the rotation of said front driving member, and other connecting means interposed between said driving members and so arranged that it will be inoperative when said rear driving member is rotated in a forward direction and will be rendered operative by the rotation of said rear driving member in a reverse direction.

20. In a self-contained portable tool, a rear driving member, means for rotating the same, a tubular front driving member, means for causing said front driving member to be rotated in a forward direction by said rear driving member, including a part yieldably mounted in said tubular front driving member for axial movement with relation thereto, and held against rotation with relation thereto, and a part connected with said rear driving member for rotation therewith and extending into said tubular front driving member, said parts having means for normally connecting the same for rotation in unison and for disconnecting the same when excessive resistance is offered to the rotation of said front driving member, and a one-way clutch interposed between said driving members to operatively connect the same when said rear driving member is rotated in a reverse direction.

21. In a mechanism of the character described, a rear driving member, a tubular front driving member, means for rotating said rear driving member, a coiled spring arranged within said front driving member and connected with said rear driving member for rotation thereby, a connecting member mounted in said tubular front driving member for yielding movement lengthwise thereof and for rotation therewith, and a shoe rotatably mounted in said front driving member and connected with the front end of said spring for rotation thereby, said shoe and said connecting member having opposed cam surfaces to form a slip connection which will cause the same to rotate normally in unison and will permit said shoe to rotate with relation to said connecting member when excessive resistance is offered to the rotation of said front driving member.

22. In a mechanism of the character described, a rear driving member, means for rotating the same, a tubular front driving member rotatably mounted in alinement with said rear driving member, a spindle rigidly connected with said front driving member and rotatably mounted in said rear driving member and held against axial movement with relation thereto, a coiled spring mounted in said tubular front driving member and connected with said rear driving member for rotation thereby, a sleeve mounted about said spindle for movement lengthwise thereof and having guiding contact with the front portion thereof, a spring to move said sleeve rearwardly, a connecting member mounted within said tubular front driving member, held against rotation with relation thereto and connected with said sleeve for movement therewith lengthwise of said front driving member, and a shoe interposed between said connecting member and said coiled spring and having a part to engage the front end of said coiled spring for rotation thereby, said shoe and said connecting member having opposed cam surfaces to cause said connecting member and said front driving member to normally rotate with said shoe and permit said shoe to rotate with relation to said connecting member when excessive resistance is offered to the rotation of the latter.

23. In a mechanism of the character described, a rear driving member, means for rotating the same, a tubular front driving member having longitudinal guideways in opposite sides thereof, a part mounted in said front driving member for rotation with relation thereto, said part being connected with said rear driving member for rotation thereby and having on its front face relatively short cam surfaces arranged on opposite sides of its axis, a connecting member mounted in said tubular front driving member for axial movement with relation thereto and having radial lugs extending into said guideways to cause said front driving member to rotate therewith, said connecting member having on its rear face relatively short cam surfaces in longitudinal alinement with said lugs and adapted to engage the first mentioned cam surfaces, and means for yieldingly pressing said connecting member rearwardly and for permitting the same to yield under the pressure of the first mentioned cam surfaces when excessive resistance is offered to the rotation of said front driving member, thereby enabling the first mentioned cam surfaces to ride over the cam surfaces of said connecting member and to successively engage the latter with a series of impacts.

24. In a mechanism of the character described, a rear driving member, means for rotating said driving member, a tubular front driving member, a part rotatably mounted in said tubular front driving member, connected with said rear driving member for rotation thereby and having a plurality of cam surfaces spaced about the axis thereof, a spindle rigidly secured to said front driving member, rotatably mounted in said rear driving member and held against axial movement with relation thereto, an annular connecting member mounted about and guided by said spindle in said front driving member for axial movement with relation thereto, said connecting member having means for causing said front driving member to rotate therewith and having a plurality of cam surfaces spaced about the rear face thereof to cooperate with the first mentioned cam surfaces, and a spring acting on said connecting member to move the same rearwardly and to hold the cam surfaces thereon in operative relation to the first mentioned cam surfaces.

25. In a mechanism of the character described, a rear driving member, means for rotating the same, a tubular front driving member rotatably mounted in alinement with said rear driving member and having a lateral opening near the front end thereof, a supporting member mounted in said front driving member for movement lengthwise thereof, a spring acting on said supporting member to move the same rearwardly, a shoe rotatably mounted in said front driving member and connected with said rear driving member for rotation thereby, a connecting member mounted about said supporting member for axial movement therewith and held against rotation with relation to said front driving member, a nut threaded onto the front end of said supporting member and having supporting engagement with said connecting member, said shoe and said connecting member having opposed cam surfaces to cause the same to rotate normally in unison and to permit said shoe to rotate with relation to said connecting member when excessive resistance is offered to the rotation of the latter, and a resilient member mounted about the exterior of said front driving member and having a part extending through the opening in said front driving member to engage said nut and hold the latter in adjusted positions on said supporting member.

26. In a power operated portable tool, a first driving member, means for rotating said first driving member, a second driving member, a driving spring arranged to be actuated by said first driving member when the latter is rotated in one direction, a slip connection comprising parts separate from and associated respectively with said spring and said second driving member, said parts having cooperating cam surfaces to cause said second driving member to normally rotate in unison with said first driving member, one of said parts being yieldable to permit said spring and said first driving member to rotate with relation to said second driving member when excessive resistance is offered to the movement of the latter, and other means for causing said second driving member to be rotated in a reverse direction.

27. In a power operated portable tool, a first driving member, means for rotating said first driving member, a second driving member, a driving spring arranged to be actuated by said first driving member when the latter is rotated in one direction, a slip connection comprising parts separate from and associated respectively with said spring and said second driving member, said parts having cooperating cam surfaces to cause said second driving member to normally rotate in unison with said first driving member, one of said parts being yieldable to permit said spring and said first driving member to rotate with relation to said second driving member when excessive resistance is offered to the movement of the latter, and other means for effecting driving of said second driving member by said first driving member when the latter is rotated in a reverse direction.

28. In a self-contained portable tool, a first driving member, means for rotating the same, a tubular second driving member, means for causing said second driving member to be rotated in a forward direction by said first driving member, including a part yieldably mounted in said tubular second driving member for axial movement with relation thereto, and held against rotation with relation thereto, and a part arranged in driving relation to said first driving member for rotation therewith and extending into said tubular second driving member, said parts having means to cause said second driving member to normally rotate in unison with said first driving member, and for permitting driving of said first driving member without rotation of said second driving member when excessive resistance is offered to the rotation of said second driving member, and other means for causing said second driving member to be rotated in a reverse direction by said first driving member.

29. In a self-contained portable tool, a first driving member, means for rotating the same, a tubular second driving member, means for causing said second driving member to be rotated in a forward direction by said first driving member, including a part yieldably mounted in said tubular second driving member for axial movement with relation thereto, and held against rotation with relation thereto, and a part arranged in driving relation to said first driving member for rotation therewith and extending into said tubular second driving member, said parts having means to cause said second driving member to normally rotate in unison with said first driving member, and for permitting driving of said first driving member without rotation of said second driving member when excessive resistance is offered to the rotation of said second driving member, and other rotary motion transmitting means interposed between said driving members and so arranged that it will be inoperative when said first driving member is rotated in a forward direction and will be rendered operative by the rotation of said first driving member in a reverse direction.

30. In a self-contained portable tool, a first driving member, means for rotating the same, a tubular second driving member, means for causing said second driving member to be rotated in a forward direction by said first driving member, including a part yieldably mounted in said tubular second driving member for axial movement with relation thereto, and held against rotation with relation thereto, and a part arranged in driving relation to said first driving member for rotation therewith and extending into said tubular second driving member, said parts having means to cause said second driving member to normally rotate in unison with said first driving member, and for permitting driving of said first driving member without rotation of said second driving member when excessive resistance is offered to the rotation of said second driving member, and a one-way clutch interposed between said driving members to operatively connect the same when said first driving member is rotated in a reverse direction.

31. In a mechanism of the character described, a first driving member, a tubular second driving member, means for rotating said first driving member, a coiled spring arranged within said second driving member and having an end in driving relation with said first driving member for rotation thereby, a connecting member mounted in said tubular second driving member for yielding movement lengthwise thereof and for rotation therewith, and a shoe rotatably mounted in said second driving member and connected with the other end of said spring for rotation thereby, said shoe and said connecting member having opposed cam surfaces to form a slip connection which will cause the same to rotate normally in unison and will permit said shoe to rotate with relation to said connecting member when excessive resistance is offered to the rotation of said second driving member.

32. In a mechanism of the character described, a first driving member, means for rotating the same, a tubular second driving member rotatably mounted in alignment with said first driving member, a spindle rigidly connected with said second driving member and rotatably mounted in said first driving member and held against axial movement with relation thereto, a coiled spring mounted in said tubular second driving member and connected with said first driving member for rotation thereby, a sleeve mounted about said spindle for movement lengthwise thereof and having guiding contact with the front portion thereof, a spring to move said sleeve rearwardly, a connecting member mounted within said tubular second driving member, held against rotation with relation thereto and connected with said sleeve for movement therewith lengthwise of said second driving member, and a shoe interposed between said connecting member and said coiled spring and having a part to engage the front end of said coiled spring for rotation thereby, said shoe and said connecting member having opposed cam surfaces to cause said connecting member and said second driving member to normally rotate with said shoe and permit said shoe to rotate with relation to said connecting member when excessive resistance is offered to the rotation of the latter.

33. In a mechanism of the character described, a first driving member, means for rotating the same, a tubular second driving member having longitudinal guideways in opposite sides thereof, a part mounted in said second driving member for rotation with relation thereto, said part being connected with said first driving member for rotation thereby and having on its front face relatively short cam surfaces arranged on opposite sides of its axis, a connecting member mounted in said tubular second driving member for axial movement with relation thereto and having radial lugs extending into said guideways to cause said second driving member to rotate therewith, said connecting member having on its rear face relatively short cam surfaces in longitudinal alignment with said lugs and adapted to engage the first mentioned cam surfaces, and means for yieldingly pressing said connecting member rearwardly and for permitting the same to yield under the pressure of the first mentioned cam surfaces when excessive resistance is offered to the rotation of said second driving member, thereby enabling the first mentioned cam surfaces to ride over the cam surfaces of said connecting member and to successively engage the latter with a series of impacts.

34. In a mechanism of the character described, a first driving member, means for rotating said driving member, a tubular second driving member, a part rotatably mounted in said tubular second driving member, connected with said first driving member for rotation thereby and having a plurality of cam surfaces spaced about the axis thereof, a spindle rigidly secured to said second driving member, rotatably mounted in said first driving member and held against axial movement with relation thereto, an annular connecting member mounted about and guided by said spindle in said second driving member for axial movement with relation thereto, said connecting member having means for causing said second driving member to rotate therewith and having a plurality of cam surfaces spaced about the rear face thereof to cooperate with the first mentioned cam surfaces, and a spring acting on said connecting member to move the same rearwardly and to hold the cam surfaces thereon in operative relation to the first mentioned cam surfaces.

35. In a mechanism of the character described, a first driving member, means for rotating the same, a tubular second driving member rotatably mounted in alignment with said first driving member and having a lateral opening near the front end thereof, a supporting member mounted in said second driving member for movement lengthwise thereof, a spring acting on said supporting member to move the same rearwardly, a shoe rotatably mounted in said second driving member and connected with said first driving member for rotation thereby, a connecting member mounted about said supporting member for axial movement therewith and held against rotation with relation to said second driving member, a nut threaded onto the front end of said supporting member and having supporting engagement with said connecting member, said shoe and said connecting member having opposed cam surfaces to cause the same to rotate normally in unison and to permit said shoe to rotate with relation to said connecting member when excessive resistance is offered to the rotation of the latter, and a resilient member mounted about the exterior of said second driving member and having a part extending through the opening in said second driving member to engage said nut and hold the latter in adjusted positions on said supporting member.

EDWIN L. CONNELL.